(12) United States Patent
Garcia-Leiner et al.

(10) Patent No.: US 8,163,827 B2
(45) Date of Patent: Apr. 24, 2012

(54) WHITE LIGHT DIFFUSING THERMOPLASTIC COMPOSITION

(75) Inventors: Manuel A. Garcia-Leiner, Newtown, PA (US); Jack J. Reilly, Blue Bell, PA (US); James Bradley, Cinnaminson, NJ (US); Jean Kryven, Bristol, PA (US)

(73) Assignee: Arkema France, Colombes (FR)

( * ) Notice: Subject to any disclaimer, the term of this patent is extended or adjusted under 35 U.S.C. 154(b) by 286 days.

(21) Appl. No.: 12/093,659

(22) PCT Filed: Nov. 7, 2006

(86) PCT No.: PCT/US2006/043199
§ 371 (c)(1),
(2), (4) Date: May 14, 2008

(87) PCT Pub. No.: WO2007/058810
PCT Pub. Date: May 24, 2007

(65) Prior Publication Data
US 2008/0242786 A1 Oct. 2, 2008

Related U.S. Application Data

(60) Provisional application No. 60/736,703, filed on Nov. 15, 2005.

(51) Int. Cl.
| C08K 3/22 | (2006.01) |
| C08K 3/34 | (2006.01) |
| C08K 3/26 | (2006.01) |
| C08K 3/30 | (2006.01) |
| B32B 7/02 | (2006.01) |
| B32B 9/04 | (2006.01) |

(52) U.S. Cl. ........ 524/423; 524/425; 524/436; 524/430; 524/432; 524/444; 428/212; 428/214; 428/411.1

(58) Field of Classification Search .................. 524/425, 524/423, 436, 430, 432, 444, 500; 428/212, 428/411.1, 412, 213
See application file for complete search history.

(56) References Cited

U.S. PATENT DOCUMENTS

| 4,418,986 A | 12/1983 | Yata et al. |
| 6,875,499 B1 * | 4/2005 | De Toffol et al. ............. 428/212 |
| 6,878,436 B2 * | 4/2005 | Reilly et al. .................. 428/221 |
| 2006/0019113 A1 | 1/2006 | Sparks et al. |

* cited by examiner

Primary Examiner — Michael M Bernshteyn
(74) Attorney, Agent, or Firm — Thomas F. Roland

(57) ABSTRACT

The invention relates to a translucent, white, light-diffusing thermoplastic composition containing both white pigment and refractive index-matched particles. The blend of pigment and particles provides a synergistic effect, resulting in a very high luminous transmission and good diffusion properties.

12 Claims, 2 Drawing Sheets

Figure 1. Diffusing behavior of 0.080" thick extruded sheets.
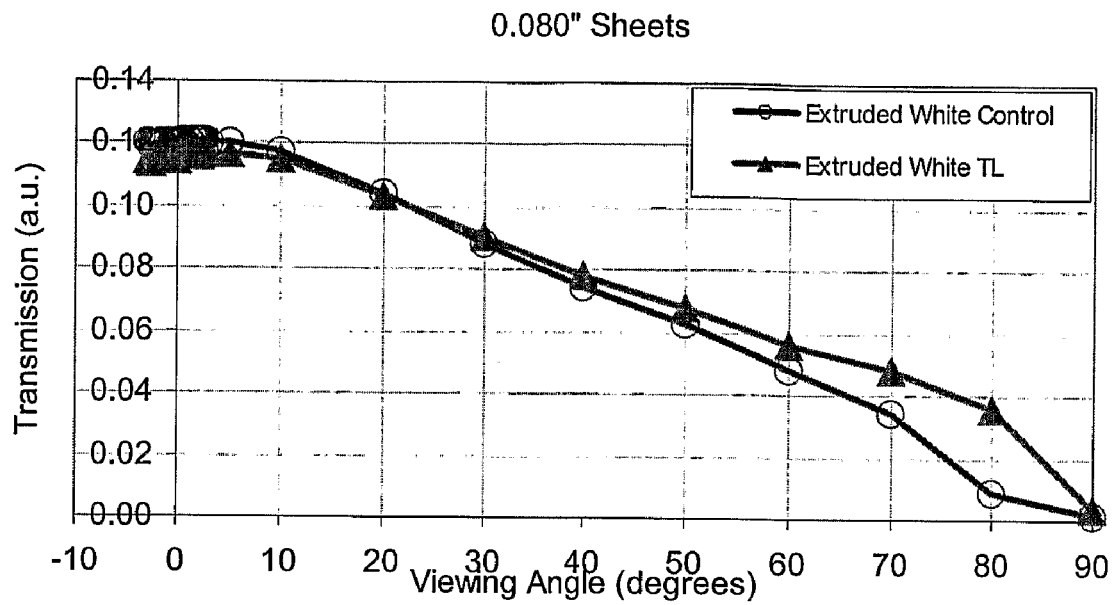
Figure 2. Diffusing behavior of 0.118" thick extruded sheets.
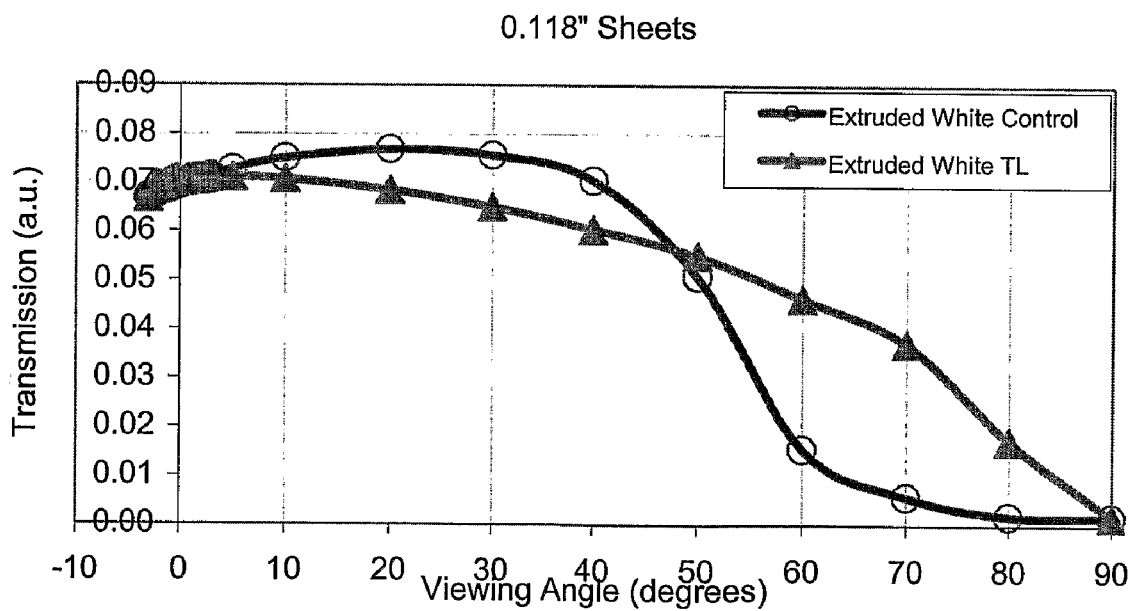

Figure 3. Diffusing behavior of 0.165" thick extruded sheets.
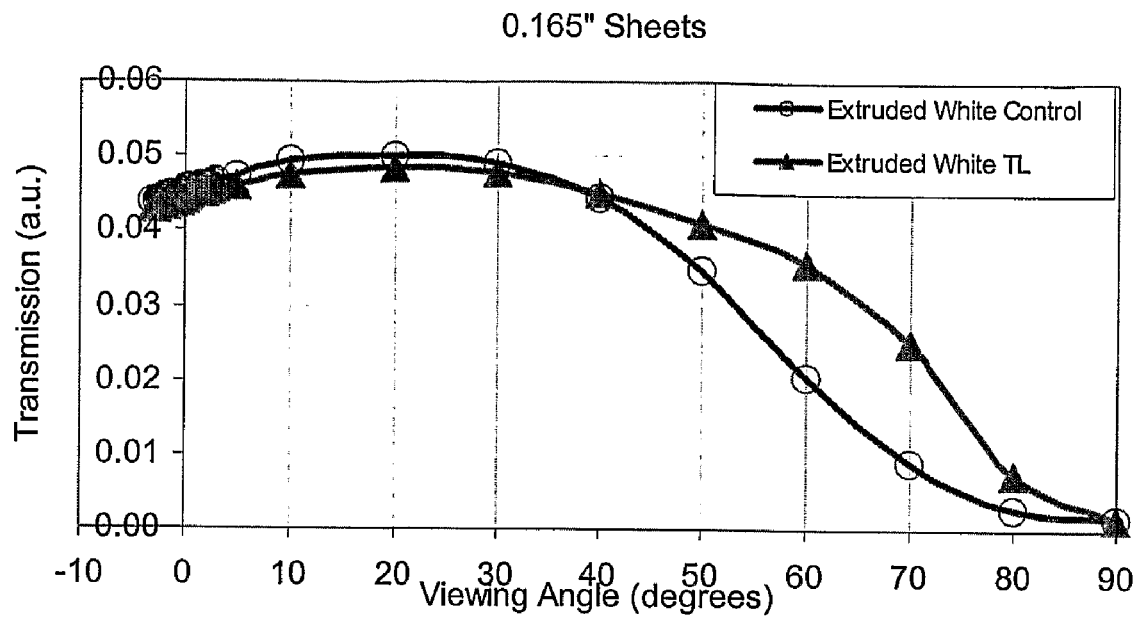
Figure 4. Diffusing behavior of 0.177" thick extruded sheets.
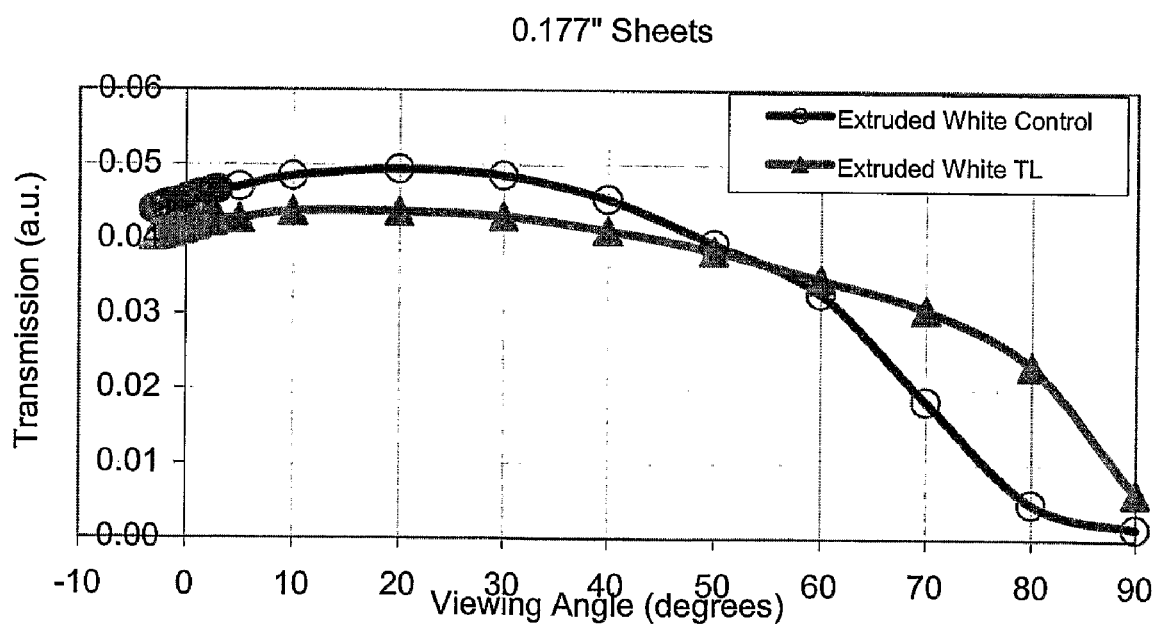

WHITE LIGHT DIFFUSING THERMOPLASTIC COMPOSITION

This application claims benefit, under U.S.C. §119 or §365 of U.S. 60/736,703, filed Nov. 15, 2005; and PCT/US2006/043199 filed Nov. 7, 2006.

FIELD OF THE INVENTION

The invention relates to a translucent, white, light-diffusing thermoplastic composition containing both white pigment and refractive index-matched particles. The blend of pigment and particles provides a synergistic effect, resulting in a very high luminous transmission and good diffusion properties.

BACKGROUND OF THE INVENTION

Light diffusing sheet is used in luminous signs, lighting covers, rear-projection screens, and other applications requiring a high level of light transmission while blurring the point light source. Effective light diffusing sheet should have excellent light transmission, good light diffusion, light scattering and weatherability.

The diffusing mechanism of a light-diffusing sheet can be caused by many different means. These include foaming the polymer (US 200200823), entrapment of air bubbles (JP 2002090515), and various surface configurations (toothed—JP202196110, concavo-convex—U.S. Pat. No. 6,741,307).

The diffusing mechanism can also be in the form of dispersed particles. The particles could be polymeric such as described in U.S. Pat. No. 6,878,436 where the polymers differ from the matrix in refractive index by at least 0.001. The particles could also be inorganic, such as $BaSO_4$, $SiO_2$, $CaCO_3$, $Al_2O_3$, $TiO_2$ and ZnO, as described in U.S. Pat. No. 4,418,986 and U.S. Pat. No. 6,875,499.

Surprisingly it has been found that the combination of both selected polymer particles and selected inorganic particles in a thermoplastic matrix produces a synergistic effect, leading to an increased luminous transmission with good diffusion, making the light-diffusing sheet visually attractive.

SUMMARY OF THE INVENTION

The invention relates to a translucent, white, light-diffusing thermoplastic composition comprising
a) a thermoplastic matrix
b) 0.1 to 5 weight percent of one or more white pigments
c) 0.3 to 15 weight percent of refractive index-matched polymer particles.

The invention further relates to an article comprising at least one light diffusing layer wherein said light-diffusing layer comprises:
a) a thermoplastic matrix
b) 0.1 to 5 weight percent of one or more white pigments
c) 0.3 to 15 weight percent of refractive index-matched polymer particles.

BRIEF DESCRIPTION OF THE DRAWINGS

FIGS. 1-4 compare the diffusing behavior of different thicknesses of white sheet for comparative sheet having no polymer particles, and sheet of the invention containing polymer particles.

DETAILED DESCRIPTION OF THE INVENTION

The invention relates to a translucent, white, light-diffusing thermoplastic composition containing both white pigment and refractive index-matched polymer particles. The blend of pigment and particles provides a synergistic effect, resulting in a very high luminous transmission and good diffusion properties.

The thermoplastic matrix material can be any thermoplastic capable of being extruded or thermoformed. Useful matrix materials include, but are not limited to, polycarbonate, acrylic polymers, polystyrene (PS), high impact polystyrene (HIPS), polyvinyl chloride (PVC), polyvinylidene fluoride (PVDF), PVDF-acrylic copolymers, imidized acrylic polymers, cyclic olefin copolymers (COC), polyolefins, impact modified polyolefins, polyesters (such as PET, PBT, APET), styrene acrylonitrile (SAN), acrylonitrile-acrylate copolymers, acrylonitrile-methyl methacrylate copolymer, methyl methacrylate-styrene copolymer, other styrenic polymers or copolymers containing alpha-methyl styrene, polyethylene terephthalate-glycol modified (PETG), methacrylate-butadiene-styrene terpolymer, acrylonitrile-styrene-acrylate (ASA) terpolymer, acrylonitrile butadiene styrene (ABS) terpolymer, polycyclo-hexylethylene, etc. and blends thereof.

In one embodiment, the matrix is an acrylic polymer matrix, which includes polymers, copolymers and terpolymers formed from alkyl methacrylate and alkyl acrylate monomers, and mixtures thereof. The alkyl methacrylate monomer is preferably methyl methacrylate, which may make up from 60 to 100 weight percent of the monomer mixture. 0 to 40 weight percent of other acrylate and methacrylate monomers may also be present in the monomer mixture. Other methacrylate and acrylate monomers useful in the monomer mixture include, but are not limited to methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers. Alkyl (meth) acrylic acids such as methyl acrylic acid and acrylic acid can be useful for the monomer mixture. Small levels of multifunctional monomers as crosslinking agents may also be used. Suitable crosslinking monomers include but are not limited to, for example, allyl methacrylate, allyl acrylate, divinylbenzene, ethylene glycol dimethacrylate and diacrylate, ethylene glycol triacrylate and trimethacrylate, butylene glycol dimethacrylate, glycidyl methacrylate, triallyl isocyanurate, N-hydroxymethyl acrylamide, N,N-methylene diacrylamide and dimethacrylamide, triallyl citrate, trimethylolpropane triacylate, trimethylolpropane trimethacrylate, diethyleneglycol divinyl ether, and the like. Styrenic monomers such as styrene and alpha-methyl styrene could also be incorporated into the polymer.

A preferred matrix is a copolymer of methyl methacrylate and from 0.5 to 30 weight percent of $C_{2-4}$ acrylates. In a preferred embodiment the matrix is a copolymer of methyl methacrylate and from 0.5-6 weight percent of ethyl acrylate.

The molecular weight of the matrix polymer can range from 50,000 to 300,000 g/mol and preferably from 70,000 to 200,000 g/mol.

The polymer particles of the invention are refractive index matched to the polymer matrix. By "refractive-index matched" is meant that the refractive indexes of the particle and matrix are within 0.02 units of each other, preferably within 0.01 units, and most preferably within 0.005 units. The polymer particles can be of any polymer, copolymer or terpolymer composition including (meth)acrylates, polystyrene, styrene/acrylonitrile, fluoropolymers, rubber or elastomeric polymers or copolymers including for example butadiene, isoprene, etc. Preferred polymer particles include polystyrene/polymethylmethacrylate and acrylic cross-linked particles.

The polymer particles may consist of a single composition and size, or may be a mixture of several different compositions and sizes.

The polymer particles have an average particle size of from 1 to 70 microns and preferably from 5 to 40 microns. The particle size distribution is generally mono-modal, but could also be bimodal.

The polymer particles are present in the sheet at from 0.3 to 15 and preferably from 0.5 to 8 weight percent, based on the total sheet composition.

The polymer particles are able to retain their integrity and shape throughout the processing steps. This could be due to several factors, including, but not limited to high molecular weight, high Tg, or sufficient cross-linking.

The particle can be of any shape, though particle that are essentially spherical are preferred. In one embodiment, acrylic copolymers are cell cast and ground to an average size of from 5 to 30 microns to form copolymer particles.

The white pigment useful in the invention aids in the diffusion of light. White pigments include, but are not limited to, barium sulfate, silicon dioxide, calcium carbonate, aluminum oxide, titanium dioxide, zinc oxide, silicates, natural and synthetic clay systems (aluminosilicates) for example montmorillonite, and mixtures thereof.

The white pigment is present in the light-diffusing sheet at from 0.1 to 5 weight percent, preferably from 0.5 to 4.0 weight percent, and most preferably from 1.3 to 3.0 weight percent, based on the total light diffusing composition.

The white pigment useful in the invention has a particle size that is large enough to diffuse the full light spectrum and avoid color emission. In general this would be an average particle size of at least 750 nanometers. The average particle size is less than 20 microns. Preferably the average particle size is from 1 to 12 microns and more preferably from 1 to 8 microns.

In addition to matrix polymer, polymer particles and white pigment, the composition of the pigment may also contain one or more additives, such as impact modifiers, anti-oxidants, dyes, colorants, UV absorbers, lubricants and fillers.

The acrylic matrix may include from 3 to 60 percent by weight, of one or more impact modifiers. Preferred impact modifiers are core-shell multi-layer polymers and block copolymers having at least one hard and at least one soft block. The core-shell (multi-layer) impact modifiers could have a soft (rubber or elastomeric) core and a hard shell; or a hard core covered with a soft elastomeric-layer, and a hard shell; of other core-shell morphology known in the art. The rubber layers are composed of low glass transition (Tg) polymers, including, but not limited to, butyl acrylate (BA), ethylhexyl acrylate (EHA), butadiene (BD), BD/styrene, butylacrylate/styrene, and many other combinations.

The acrylic matrix may also include from 0 to 100 percent by weight of a copolymer of controlled architecture that could be prepared by specific polymerization routes. Such routes may include, but are not limited to, controlled radical polymerization techniques, such as Atom-Transfer Radical Polymerization (ATRP), Reversible Addition Fragmentation chain Transfer (RAFT) or nitroxide-mediated controlled radical polymerization.

The composition of the invention is formed by blending the matrix polymer, white pigment, polymer particles and other additives to form the light-diffusing composition. The components may be blended by means known in the art. In one embodiment, the various components are melt compounded in an extruder. Two or more of the components could be physically pre-blended, followed by blending in the melt stage. The composition can then be extruded or injection/compression molded directly into articles, or into sheets, films, profiles, or pellets that can be further processed into articles.

The light diffusing composition could be used as a monolithic sheet or article, or can be co-extruded (or laminated or otherwise adhered) with other thermoplastics to form a light-diffusing composite. The light-diffusing sheet could be used to form a middle (or inner) layer of a multi-layer sheet, or may form both outer layers of a sheet having three or more layers.

The light-diffusing monolithic sheet will generally have a thickness of between 0.010 in and 1.0 in, preferably 0.020 in to 0.4 in, and more preferably 0.030 in. to 0.25 in. When used in a multi-layer construction, the diffusion layer(s) can be used in a thickness of from 0.001 in to 0.200 in, and preferably 0.005 in to 0.100 in.

The light-diffusing sheet may be polished or otherwise finished to improve the surface.

The light-diffusing composition of the present invention shows synergistic properties from the use of both light-diffusing particles and white pigment in a single thermoplastic matrix.

A 0.080 inch thick sheet made from the light-diffusing composition would have a luminous transmission of greater than 60%; a hiding power of greater than 0.8, preferably above 0.9, and most preferably above 1.0; a diffusion factor of at least 0.5, preferably above 0.62, and most preferably above 0.65; and a half gain angle of at least 50 degrees, preferably above 52 degrees, and most preferably above 55 degrees.

The light diffusing composition of the invention is useful in thin film transistor-liquid crystal display TV (TFT-LCD TV) applications, luminous signs, lighting covers, and rear-projection screens.

EXAMPLES

Formulations

Light-diffusing compositions were obtained, or prepared, having the properties as shown in Table 1.

Preparation of Extruded White TL Sample

Crosslinked beads comprised of a 96% methyl methacrylate/4% ethyl acrylate copolymer with allyl methacrylate used as the crosslinking agent, that are substantially spherical, having a mean particle diameter of about 10 to 32 microns, wherein 90% of the particles by weight are less than 40 microns in diameter, and a refractive index (nD) of 1.4907 were melt blended into an acrylic molding resin (methyl methacrylate/ethyl acrylate 96/4) at 5% by weight. The refractive index (nD) of the acrylic molding resin used above was measured as 1.4935 in accordance with ASTM D 542. Hence the refractive index of the bead is very similar compared to that of the acrylic matrix. Additionally, 2% by weight of $BaSO_4$ particles having an average diameter of 3 microns were also melt blended in an extruder. The other samples were prepared in a similar fashion, using the compositions shown in Table 1.

TABLE 1

Example of formulation development experiments for light-diffusing sheets.

| | | Polymer Matrix | | Inorganic Pigment | | Light-diffusing particles | |
|---|---|---|---|---|---|---|---|
| Sample | % wt. | Composition | Molecular Weight (g/mol) | % wt. | Type | % wt. | Type |
| 1 Commercial (comparative) | — | Acrylic based | — | — | CaCO$_3$ | — | None |
| 2 Commercial (comparative) | — | 96.5% PMMA 3.5% PMA | — | 3.1 | Silicate (Talc) | — | None |
| 3 Commercial (comparative) | — | PMMA 4-5% PEA | 115,000 | — | TiO$_2$ | — | None |
| 4 Commercial (comparative) | 98.33 | PMMA 4-5% PEA | 115,000 | — | None | 1.667 | PS-PMMA cell cast particles |
| 5 (comparative) | 96.7 | PMMA 0.6% PEA | 85,000 | 2.2 | BaSO$_4$ (3 μm) | — | None |
| 6 (comparative) | 97.13 | PMMA 0.6% PEA | 85,000 | 1.47 | BaSO$_4$ (3 μm) | 0.665 | PS-PMMA cell cast particles |
| 7 (comparative) | | PMMA 0.6% PEA | 85,000 | | | | |
| 8 (comparative) | 97 | PMMA 0.6% PEA | 85,000 | 2 | BaSO$_4$ (3 μm) | — | None |
| 9 (comparative) | 97.8 | PMMA 0.6% PEA | 85,000 | — | None | 2.2 | Acrylic cross-linked particles (17-22 μm) |
| 10 (comparative) | 96.85 | PMMA 0.6% PEA | 85,000 | 2.1 | BaSO$_4$ (3 μm) | — | None |
| 11 | 92 | PMMA 0.6% PEA | 85,000 | 2 | BaSO$_4$ (3 μm) | 5 | Acrylic cross-linked particles (17-22 μm) |
| Extruded White Control (comparative) | 97 | PMMA 4-5% PEA | 115,000 | 2 | BaSO$_4$ (3 μm) | — | None |
| Extruded White TL | 92 | PMMA 4-5% PEA | 115,000 | 2 | BaSO$_4$ (3 μm) | 5 | Acrylic cross-linked particles (17-22 μm) |

Note:
Extruded sheets (Extruded White Control and Extruded White TL) were prepared in four different thicknesses: 0.080, 0.118, 0.165 and 0.177 in.

Optical properties (light transmission/reflection, gloss and angular dependent-transmission or reflection via goniophotometry) were measured for a 0.080 inch thick plaque of each sample. The results in transmission are shown in Table 2.

Light-diffusing properties of these materials were obtained by analyzing the angular dependent transmission using Goniophotometry. From these results, Hiding power, half gain angle and diffusing factor values have been quantified for all the samples described here. The value of hiding power is estimated according to the following expression:

$$H.P. = \frac{T_{(2°)}}{T_{(0°)}}$$

Where H.P. is the hiding power, $T_{(2°)}$ represents the transmission value at 2° viewing angle and $T_{(0°)}$ is the transmission value at 0° viewing angle. In addition, half gain angle is defined as the viewing angle where the magnitude of the maximum transmission value (typically observed near a 0° viewing angle) is reduced by a half. Finally, diffusion factor is estimated using the following expression:

$$D.F. = \frac{T_{(20°)} + T_{(70°)}}{2 \cdot T_{(5°)}}$$

Where D.F. is the diffusion factor and $T_{(20°)}$, $T_{(70°)}$ and $T_{(5°)}$ represent the transmission value at 20°, 70° and 5° viewing angle, respectively. The results of these calculations are summarized in Tables 2-3.

TABLE 2

Properties of developed formulations. (Small samples-0.080" thick)

| | Diffusing Properties | | | Total Light Transmission | Transmitted Color | | |
|---|---|---|---|---|---|---|---|
| Sample | Hiding Power | Diffusion Factor | Half Gain Angle | % | L | a | b |
| 1 (comp) | 0.995 | 0.800 | 70-80 | 49.5 | 70.32 | 0.33 | 0.71 |
| 2 (comp) | 1.013 | 0.750 | 70-80 | 55.0 | 74.54 | 0.48 | 1.32 |

TABLE 2-continued

Properties of developed formulations. (Small samples-0.080" thick)

| | Diffusing Properties | | | Total Light Transmission | Transmitted Color | | |
|---|---|---|---|---|---|---|---|
| Sample | Hiding Power | Diffusion Factor | Half Gain Angle | % | L | a | b |
| 3 (comp) | 0.799 | 0.904 | 70-80 | 30.0 | 54.80 | 0.71 | 2.90 |
| 4 (comp) | 1.015 | 0.875 | 70-80 | 48.1 | 69.38 | 0.47 | 2.66 |
| 5 (comp) | 0.347 | 0.875 | 1.0-1.25 | 45.8 | 67.66 | 0.41 | 1.60 |
| 6 (comp) | 0.995 | 0.768 | 70-80 | 50.5 | 71.08 | 0.38 | 2.28 |
| 7 (comp) | 0.134 | 0.583 | 1.0-1.25 | 60.3 | 77.67 | 0.59 | 1.59 |
| 10 (comp) | 0.999 | 0.614 | 50-60 | 64.6 | 80.38 | 0.39 | 0.99 |
| 11 | 1.010 | 0.659 | 50-60 | 64.2 | 80.12 | 0.32 | 1.20 |

Note:
For commercial samples 3 and 4, 0.118 inch thick chip samples were used for these measurements.

A Gretag Macbeth Color-eye 7000 colorimeter was used to measure the L, a, and b values in both transmission and reflectance mode. The color values of the samples were measured using a 2° observer and light source C as the illuminant. At least five measurements were taken of each sample and an average for the values of L, a, and b were calculated. Results obtained in transmission mode are summarized in Tables 2 and 3. Also, total light transmission was obtained as the magnitude of Y using FMC-II expression during the same color measurement.

Sheet Extrusion.

Sheets were extruded for several compositions as follows: Dry-blends of the color concentrate containing the inorganic pigment ($BaSO_4$) and the acrylic copolymer matrix (115,000 molecular weight and 4-5% EA) were prepared in a tumble-drier, This blend was compounded using a WP twin-screw blender with an additional powder feeder to introduce the acrylic cross-linked particle beads at the right amount. In addition, a reference material without the cross-linked acrylic particles. was produced to understand the effect of these, refractive index match beads, in the overall optical properties of the material.

Sheet samples of 0.080, 0.118, 0.165 and 0.177 inch thickness were taken for analysis of the optical properties and for detection of any processing difficulties associated with each formulation. Processing did not evidence any problems. Results obtained for the extruded sheets are summarized in Table 3 and plotted in FIGS. 1-4.

TABLE 3

Properties of extruded sheets.

| | Diffusing Properties | | | Total Light Transmission | Transmitted Color | | |
|---|---|---|---|---|---|---|---|
| Sample | Hiding Power | Diffusion Factor | Half Gain Angle | % | L | a | b |
| Sample 11 0.080 in. | 1.010 | 0.659 | 50-60 | 64.2 | 80.12 | 0.32 | 1.20 |
| Extruded White Control 0.080 in. | 1.007 | 0.576 | 50-60 | 64.3 | 80.83 | 0.52 | −0.21 |
| Extruded White Control 0.118 in. | 1.018 | 0.569 | 50-60 | 49.6 | 70.98 | 0.43 | 0.07 |
| Extruded White Control 0.165 in. | 1.026 | 0.623 | 50-60 | 41.2 | 64.73 | 0.34 | 0.23 |
| Extruded White Control 0.177 in. | 1.018 | 0.722 | 60-70 | 41.1 | 64.68 | 0.35 | 0.21 |
| Extruded White TL 0.080 in. | 1.013 | 0.650 | 50-60 | 63.5 | 80.36 | 0.28 | 1.00 |
| Extruded White TL 0.118 in. | 1.006 | 0.743 | 70-80 | 49.9 | 71.31 | 0.08 | 1.91 |
| Extruded White TL 0.165 in. | 1.028 | 0.798 | 70-80 | 39.7 | 63.69 | −0.11 | 2.73 |
| Extruded White TL 0.177 in. | 1.022 | 0.871 | 80-90 | 38.5 | 62.70 | −0.10 | 2.69 |

Results indicate consistency between the extruded sheet and the properties measured earlier for sample 11. These experiments show a synergistic effect between the refractive index matched acrylic cross-linked particles and the inorganic pigment (BaSO$_4$) showing significantly higher light transmission at high viewing angles when the cross-linked particles are introduced. This is evident when comparing the higher values in diffusion factor and half gain angle of the light-diffusing sheets (White TL) with respect those without acrylic cross-linked particles (White Control), as shown in Table 3. The specific compositions are listed in Table 1. Clear contribution of the presence of the acrylic cross-linked particles to the diffusing behavior has been demonstrated at various thicknesses as shown in FIGS. 1-4.

The presence of acrylic cross-linked particles promotes a fine texture that makes the light-diffusing sheet visually attractive. Gloss values were obtained for the above-described extruded sheets and are included below in Table 4.

TABLE 4

Texture of extruded sheets.

| Sample | Gloss | | |
|---|---|---|---|
| | 20 degrees | 60 degrees | 85 degrees |
| Extruded White Control 0.080 in. | 72.3 | 84.4 | 88.9 |
| Extruded White Control 0.118 in. | 60.0 | 79.8 | 93.5 |
| Extruded White Control 0.165 in. | 68.6 | 85.8 | 97.4 |
| Extruded White Control 0.177 in. | 57.7 | 79.9 | 91.2 |
| Extruded White TL 0.080 in. | 5.2 | 24.9 | 22.8 |
| Extruded White TL 0.118 in. | 5.5 | 26.6 | 25.5 |
| Extruded White TL 0.165 in. | 6.0 | 30.7 | 32.1 |
| Extruded White TL 0.177 in. | 7.0 | 31.4 | 31.5 |

What is claimed is:

1. A translucent, white, light-diffusing thermoplastic composition comprising, in blended form,
   a) an acrylic matrix polymer;
   b) 0.1 to 5 weight percent of one or more white pigments;
   c) 0.3 to 15 weight percent of refractive index-matched polymer particles, wherein said refractive index-matched polymer particles have a refractive index within 0.01 units of said thermoplastic, matrix polymer, wherein said composition is in the form of a sheet, film, profile or pellet, and wherein a 0.080 inch thick sheet of said light-diffusing composition has a luminous transmission of greater than 60%, a hiding power of greater than 0.8, a diffusion factor of greater than 0.62, and a half gain angle of at least 50 degrees.

2. The translucent composition of claim 1 wherein said thermoplastic matrix polymer comprises a controlled architecture copolymer prepared by a controlled radical polymerization technique.

3. The translucent composition of claim 2, wherein said controlled radical polymerization technique is selected from the group consisting of Atom-Transfer Radical Polymerization (ATRP), Reversible Addition Fragmentation chain Transfer (RAFT), and nitroxide-mediated controlled radical polymerization.

4. The translucent composition of claim 1 wherein said white pigment comprises one or more pigments selected from the group consisting of BaSO$_4$, SiO$_2$, CaCO$_3$, Al$_2$O$_3$, TiO$_2$, ZnO, and aluminosilicates.

5. The translucent composition of claim 1 wherein said white pigment comprises from 0.5 to 4.0 weight percent of said composition.

6. The translucent composition of claim 1 wherein said white pigment has an average particle size of from 1 to 20 microns.

7. The translucent composition of claim 1 wherein said refractive index-matched polymer particles have an average particle size of from 1 to 70 microns.

8. The translucent composition of claim 1 wherein said refractive index-matched polymer particles comprise from 0.5 to 8 weight percent of said composition.

9. The translucent composition of claim 1 further comprising at least additives, selected from the group consisting of impact modifiers, anti-oxidants, dyes, colorants, UV absorbers, lubricants and fillers.

10. An article comprising at least one light diffusing layer having the composition of claim 1, wherein the light diffusing layer has a luminous transmission of greater than 60%, a hiding power of greater than 0.8, a diffusion factor of greater than 0.62, and a half gain angle of at least 50 degrees, when measured on a 0.080 inch thick sheet.

11. The article of claim 10 comprising a light-diffusing sign, thin film transistor-liquid crystal display TV (TFT-LCD TV) applications, luminous signs, lighting covers, or a rear-proection screens.

12. The translucent composition of claim 1 further comprising dyes, colorants, UV absorbers, or a mixture thereof.

* * * * *